Sept. 16, 1941.  C. W. CRUMRINE  2,256,373
FOCUSING CAMERA
Filed Feb. 16, 1940  2 Sheets-Sheet 1
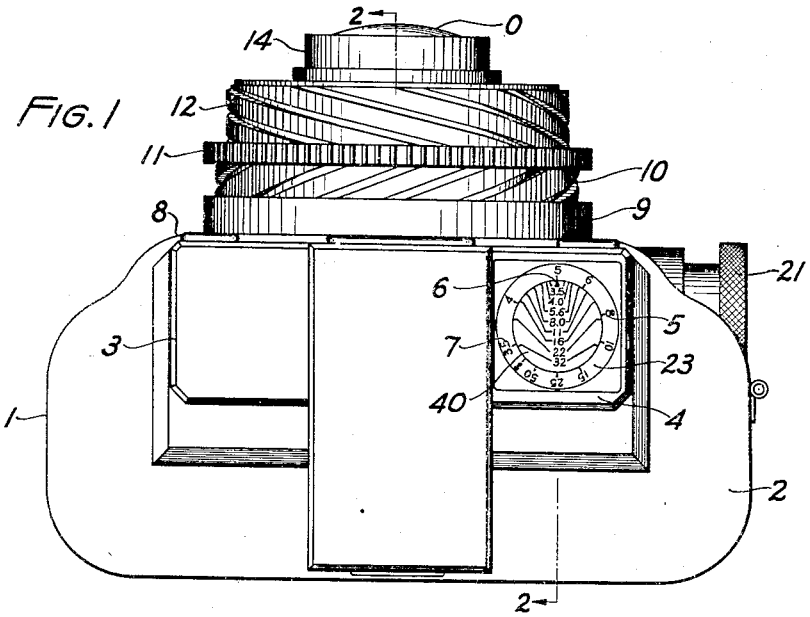
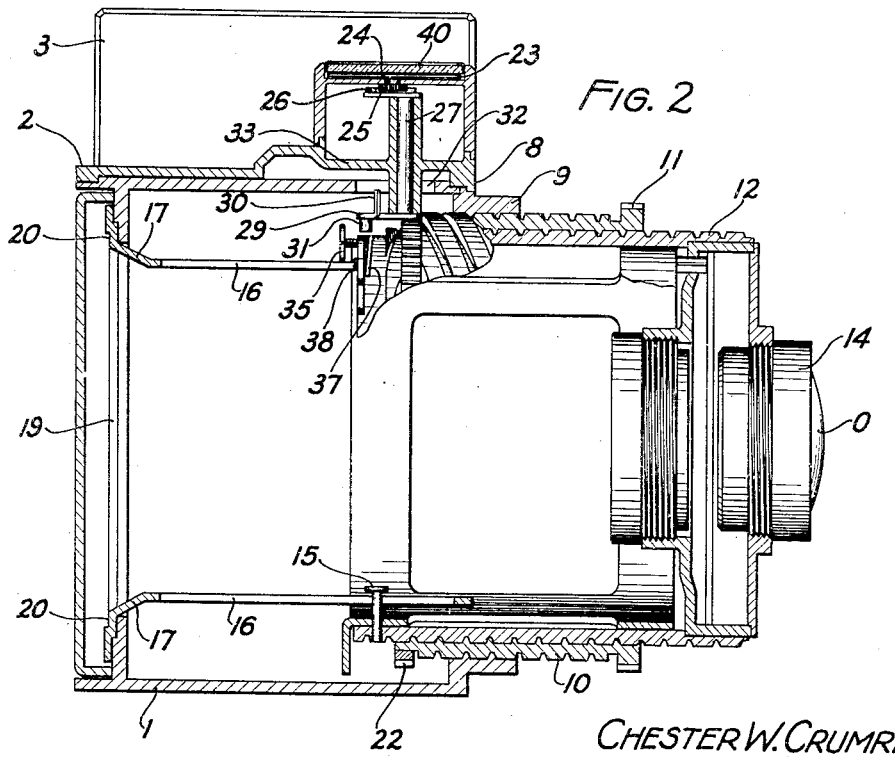
CHESTER W. CRUMRINE
INVENTOR
BY
ATTORNEYS Sept. 16, 1941.   C. W. CRUMRINE   2,256,373
FOCUSING CAMERA
Filed Feb. 16, 1940   2 Sheets-Sheet 2
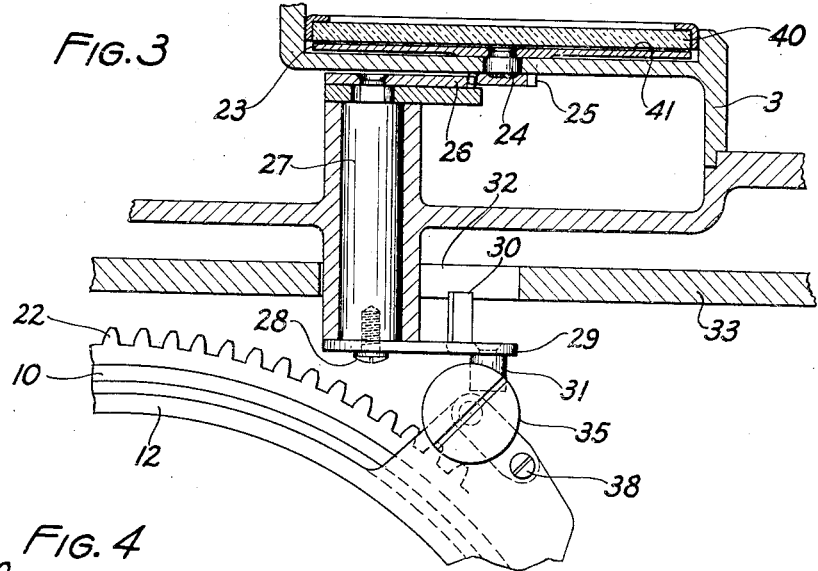
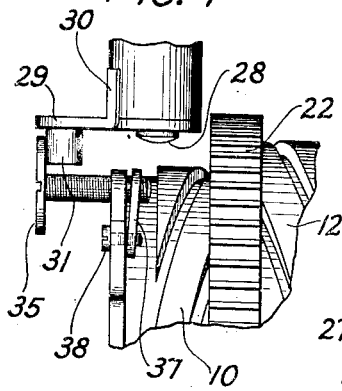
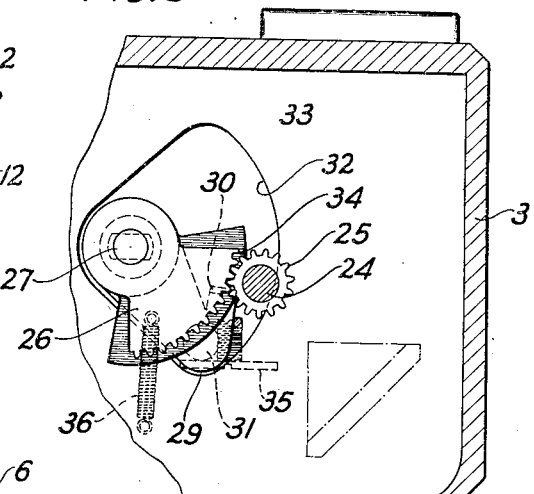
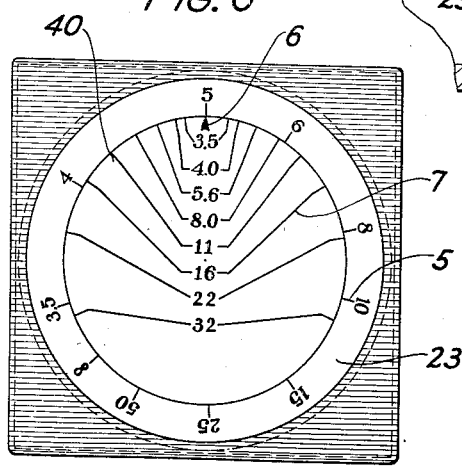
CHESTER W. CRUMRINE
INVENTOR
BY
ATTORNEYS Patented Sept. 16, 1941

2,256,373

UNITED STATES PATENT OFFICE 2,256,373

FOCUSING CAMERA

Chester W. Crumrine, Rochester, N. Y., assignor to Eastman Kodak Company, Rochester, N. Y., a corporation of New Jersey Application February 16, 1940, Serial No. 319,304

2 Claims. (Cl. 95—45)

This invention relates to cameras, and particularly to cameras in which the objective is moved relative to the exposure frame to focus an image thereon.

One object of my invention is to provide a camera of the type including a mechanism for focusing an objective with a focus indicating means mounted on the camera body. Another object of my invention is to provide the upper wall of a camera with a focusing scale which will turn as the camera objective is focused to indicate at all times the focal setting of the objective. Still another object of my invention is to provide a focusing scale which may operate in conjunction with a depth of focus scale both mounted on a top wall of a camera. Another object of my invention is to provide a camera of the type having an extensible front and including a means for focusing the camera lens with connections between the focusing objective and camera body to indicate on the camera body the focal setting of the objective, and other objects will appear from the following specification, the novel features being particularly pointed out in the claims at the end thereof.

Coming now to the drawings, wherein like reference characters denote like parts throughout:

Fig. 1 is a top plan view of a focusing camera equipped with my improved focus indicating device.

Fig. 2 is an enlarged section, taken on line 2—2 of Fig. 1, many unessential parts of the camera being omitted for the sake of clearness.

Fig. 3 is a greatly enlarged fragmentary sectional view, parts being shown in elevation, of the connections between the objective carrier and the focusing scale.

Fig. 4 is a fragmentary side elevation of a portion of the dial operating mechanism showing its contact with extensible front members.

Fig. 5 is an enlarged fragmentary section through a portion of a range finder housing showing, in elevation, parts of the gearing connecting the focusing mechanism and extensible front.

Fig. 6 is a greatly enlarged view of a preferred form of focusing dial and depth of focus scale.

In cameras having an extensible front for projecting an objective into an operative position from which it may be moved by suitable means for focusing, it is desirable to indicate the focal setting of the objective in all positions, even though the camera may be equipped with a range finder. In order to place the necessary scales for indicating the focal setting in a position where it is readily visible, I have placed a dial and pointer on the camera body and have interconnected it with the camera objective, because this position is the most desirable for cameras of the type described.

In the drawings, which show a preferred embodiment of my invention, I have shown a camera of the type shown in application Serial No. 229,151, Joseph Mihalyi, "Roll film camera," filed September 9, 1938. It is obvious that my invention is equally suitable and can be applied to other types of cameras.

As indicated in Fig. 1, the camera may consist of a camera body 1, having a top wall 2, on which a housing 3 is placed, this housing enclosing a view finder and range finder, and providing a flat upper wall or surface 4 which provides a convenient location for a focusing scale 5, which may operate in conjunction with a pointer 6, and, if desired, which may include also a depth of focus scale 7.

The camera front wall 8 includes a ring 9 which, in turn, encloses a threaded tubular member 10, terminating in a knurled ring 11. Inside of the tubular member 10 is a second tubular member 12 which supports a camera objective 13 in a suitable lens cell 14.

As indicated in Fig. 2, the tubular members 10 and 12 are both threaded, one being threaded in a right-hand direction and the other in a left-hand direction. Since the tubular member 12 may not turn because of the pins 15 passing through the slots 16 of the guide brackets 17 when the knurled ring 11 is turned, the objective, designated broadly as O, will be projected to or from a picture-taking position, in which the objective is spaced from an exposure frame 19, having guides 20 for supporting a film.

The focusing mechanism for the objective O may be the knurled ring 11, which may be turned to focus the objective, or the tubular member 10 may be turned by the knurled knob 21 which is intergeared to the gear teeth 22, carried by the back of the ring 10 and which may be intergeared with the knob 21 in the manner shown in the above-mentioned copending application.

Coming now to my invention, I prefer to form the focusing scale 5 as shown in Figs. 3 and 6. The focusing scale 5 is carried upon a disc 23, which is revolubly mounted on a stud 24, carrying a pinion 25. This pinion meshes with a gear segment 26 carried on the upper end of a shaft 27, which is arranged at right angles to the axis of the camera objective O. The lower end of shaft 27, by means of a screw 28, carries a lever arm 29, having an upstanding lug 30 and a downwardly extending pin 31.

The lug 30 may extend into a slot 32 in the camera wall plate 33 so as to form a stop limiting the movement of this lever in a counterclockwise direction with respect to Fig. 5. Movement of the lever in an opposite direction may be limited by means of a long tooth 34 which will strike the pinion 26 and prevent further movement when the gear and gear segment have reached the position shown in Fig. 5. In this position, the stud 35 is still in contact with the pin 31, carried by the lever 29, but further movement of the extensible front into the camera body will move the stud head 35 away from the pin 31 as the tubular members 10 and 12 telescope into the camera body.

I prefer to provide a spring 36 which will tend to turn the gear segment 26 and the arm 29 in a clockwise direction.

As indicated in Fig. 4, the stud head 35 may be fastened in any set position relative to the tubular member 12, by means of the plate 37 and the screw 38. After adjusting the headed screw 35 to the proper position, the screw 38 is turned to lock the stud at the desired setting.

When the camera front is projected toward a picture-taking position, the parts are so arranged that the stud head 35 will contact with the pin 31 of the lever arm 29 at the time the objective reaches the infinity position and movement of the focusing mechanism through the knurled ring 11, or the knob 21 will cause the screw head 35 to swing the shaft 27 and thus turn the plate 23 which carries the focusing scale 5. Thus, the scale 5 is moved as the objective is focused, and by bringing the desired graduation of the scale opposite to the pointer 6, the required focal setting can be obtained. It is, of course, possible to provide a fixed scale and a movable pointer, and these parts can be readily reversed, if desired, but I prefer to move the focusing scale because it is a simple matter to combine it with a depth of focus scale 7 in the following manner:

In the top wall 4, I may mount a piece of transparent material, such as glass or a clear cellulosic sheeting 40, and on the under side 41 of this sheeting, I prefer to provide the depth of focus scale 7 in opaque characters. This may be readily done by photography or the plate may be engraved and filled in with opaque material. With this arrangement, the depth of focus scale always remains stationary, while the focusing scale moves. As will be seen from Fig. 6, if the camera is focused on 5 feet, and a stop of f/16, for instance, is used, everything between approximately 4 feet and 7 feet will be sharply focused, whereas with the same focal setting, if an aperture of f/8 is used, everything between approximately 3 feet and 6 feet will be in focus.

The operation of this device is extremely simple, and it needs no attention from the operator. Assuming the camera is in an inoperative or folded position, the objective O may be positioned for picture-taking by moving the extensible front sections 10 and 12 out of the camera body, either by turning the knurled ring 11 or the knob 21. As the objective approaches its infinity position, the stud head 35 contacts with the downwardly projecting pin 31 of lever arm 29. Further forward movement of the objective rocks the shaft 27 and with it the gear segment 26 and the pinion 25, thus turning the dial 23, carrying the focusing scale. As soon as the desired focal distance is brought opposite the pointer 6, the camera will be in focus.

When the camera is to be folded into an inoperative position, after the first short movement of the objective back to its infinity position, the dial plate 23 will remain stationary, because the stud head 35 leaves the pin 31 and does not contact with it through the entire remaining part of the movement. Thus, the dial plate is only moved through the necessary range of movement to care for the focusing movement of the objective.

What I claim is:

1. In a camera including an exposure frame across which film may lie in position to receive an exposure, the combination with a camera body, of a screw-out extensible front threaded to the camera body, an objective carried by the screw-out front, an abutment carried by the screw-out front, a first shaft pivotally mounted on the camera having an axis transverse to the axis of the objective, a lever arm carried by the first shaft and projecting into the path of movement of the abutment on the screw-out front, a two part focus indicator comprising a scale and pointer, one part fixedly attached to the camera, a second shaft for carrying the other part of the focusing scale, a gear on the shaft, and, a gear segment carried by the first shaft and meshing with the pinion, a stop and spring for determining a position of rest for the first shaft, said shaft being movable from the position of rest by the screw-out front abutment when said front is moved for focusing the objective.

2. In a camera including an exposure frame across which film may lie in position to receive an exposure, the combination with a camera body, of a screw-out extensible front threaded to the camera body, an objective carried by the screw-out front, an abutment carried by the screw-out front, a first shaft pivotally mounted on the camera having an axis transverse to the axis of the objective, a lever arm carried by the first shaft and projecting into the path of movement of the abutment on the screw-out front, a two part focus indicator comprising a scale and pointer, a fixedly mounted transparent member bearing a pointer and depth of focus scale, a focusing scale, a disk carrying the focusing scale directly beneath the transparent window to cooperate with the scale and pointer thereon, a second shaft for carrying the disk, a gear on the second shaft, and a gear segment meshing therewith and carried by the first shaft, means for normally holding the disk in a position of rest while the screw-out front is moving the objective toward a picture-taking position, said abutment carried by the screw-out front being adapted to move said lever and first shaft from its position of rest when movement of the screw-out front is continued to focus the objective at distances listed on the focusing scale, whereby focusing scale movement indicates that the objective is in a picture-taking position.

CHESTER W. CRUMRINE.